United States Patent
Takumai et al.

(10) Patent No.: US 7,145,850 B2
(45) Date of Patent: Dec. 5, 2006

(54) OPTICAL DISC RECORDING APPARATUS AND CONTROL METHOD THEREFOR

(75) Inventors: Susumu Takumai, Hamamatsu (JP); Yoshihiko Shiozaki, Shizuoka-ken (JP)

(73) Assignee: Yamaha Corporation, Hamamatsu (JP)

( * ) Notice: Subject to any disclaimer, the term of this patent is extended or adjusted under 35 U.S.C. 154(b) by 344 days.

(21) Appl. No.: 10/255,774

(22) Filed: Sep. 26, 2002

(65) Prior Publication Data
US 2003/0081516 A1 May 1, 2003

(30) Foreign Application Priority Data
Sep. 28, 2001 (JP) ............ P2001-304581

(51) Int. Cl.
G11B 7/00 (2006.01)
(52) U.S. Cl. ............ 369/47.31; 369/59.25; 369/47.28
(58) Field of Classification Search .......... 369/47.31, 369/47.21, 47.27, 47.28, 59.25, 47.25; G11B 7/00, G11B 20/18
See application file for complete search history.

(56) References Cited

U.S. PATENT DOCUMENTS

| | | | | |
|---|---|---|---|---|
| 5,212,678 A | * | 5/1993 | Roth et al. ............ | 369/47.33 |
| 5,479,456 A | * | 12/1995 | Rhebergen ............ | 375/361 |
| 6,269,059 B1 | | 7/2001 | Kuroda et al. | |
| 6,498,773 B1 | * | 12/2002 | Sugie et al. ............ | 369/47.28 |
| 6,650,606 B1 | * | 11/2003 | Banno ............ | 369/47.48 |
| 6,665,246 B1 | * | 12/2003 | Moriwaki ............ | 369/47.55 |
| 6,791,922 B1 | * | 9/2004 | Suzuki ............ | 369/47.3 |
| 6,909,678 B1 | * | 6/2005 | Morishima ............ | 369/47.3 |

FOREIGN PATENT DOCUMENTS

JP    11-345462    12/1999

* cited by examiner

*Primary Examiner*—A M Psitos
(74) *Attorney, Agent, or Firm*—Pillsbury Winthrop Shaw Pittman LLP

(57) ABSTRACT

A phase difference detection circuit (270) and a gain adjusting circuit (280) are provided in an optical disc recording apparatus (200). When the phase difference detection circuit detects a phase difference between an ATIP synchronization signal and a recording synchronization signal, this phase difference detection circuit activates an internal counter (271). Then, when phase difference information including a result of a counting operation performed by the internal counter is outputted from the phase difference detection circuit to the gain adjusting circuit, the gain adjusting circuit suitably adjust the frequency division ratio of a (1/N)-frequency-divider (242) according to the received phase difference information. Thus, the phase of a recording clock signal to be supplied from a PLL circuit (240) to a data encoder (260) through a frequency divider (250) is controlled.

7 Claims, 16 Drawing Sheets

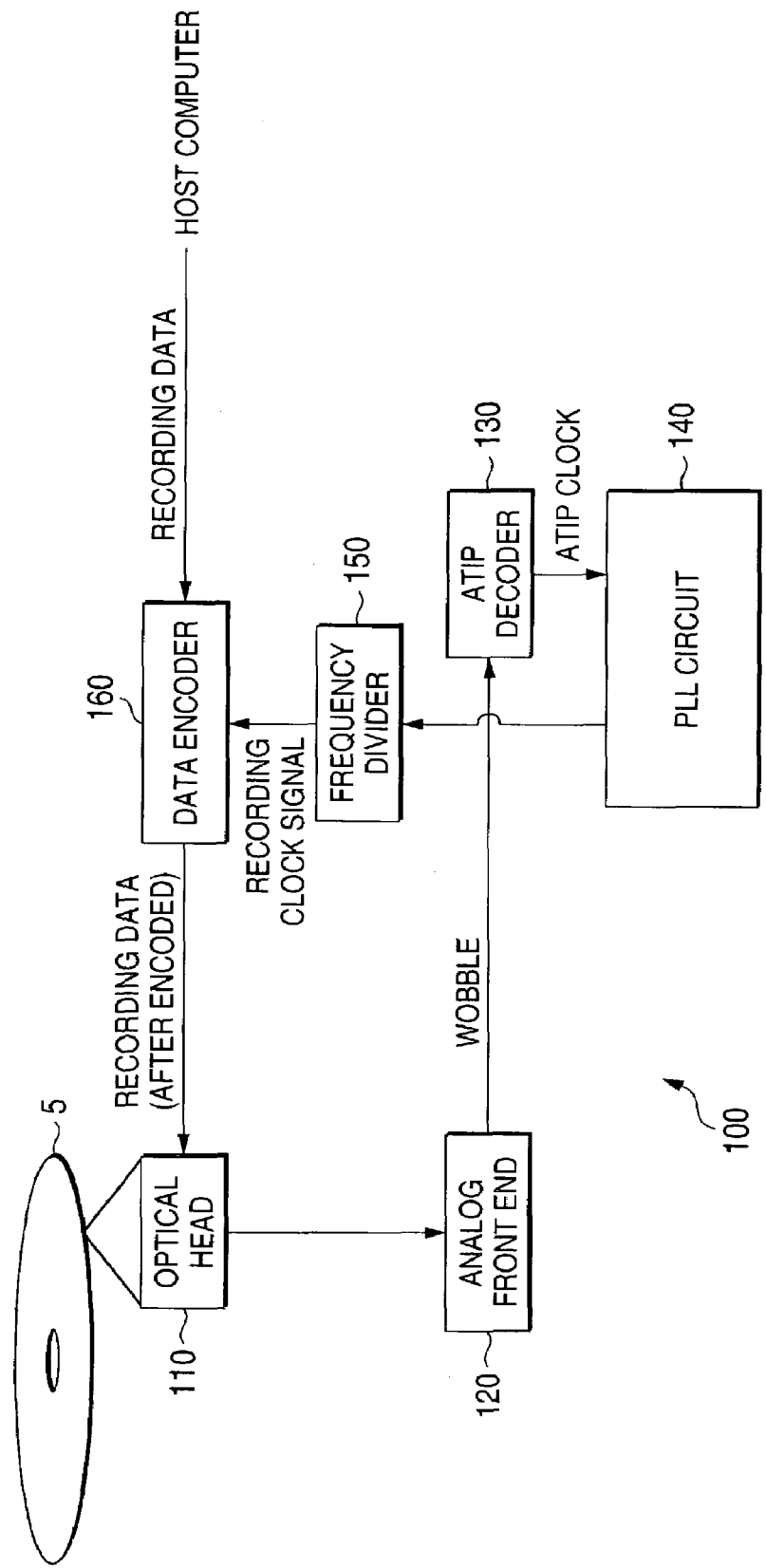

OPTICAL DISC RECORDING APPARATUS AND CONTROL METHOD THEREFOR

BACKGROUND OF THE INVENTION

The present invention relates to an optical disc recording apparatus for recording information on an optical disc, such as a CD-R (Compact Disc-Recordable) and a CD-RW (Compact Disc-ReWritable), and to a control method therefor.

An optical disc recording apparatus adapted to record information on an optical disc by irradiating the optical disc with light beams to thereby change the optical property of a recording layer thereof has been widely utilized.

FIG. 17 is a view schematically illustrating an optical disc 5 typified by a CD-R.

As illustrated in FIG. 17, guide grooves (or pre-grooves) P are preliminarily formed in an optical disc 5. When data is recorded thereon and reproduced therefrom, an operation of controlling a tracking servo and a spindle motor is performed by utilizing the pre-grooves P. Each of the pre-grooves slightly meanders (or wobbles) in a radial direction of the optical disc 5. ATIP (Absolute Time In Pre-Groove) information including absolute time information on the optical disc 5 is detected by detecting displacement of return light of a light beam irradiated on the pre-grooves.

FIG. 18 is a view illustrating the configuration of an optical disc recording apparatus for recording data on the optical disc 5.

An optical head 110 is operative to output laser light according to recorded data, which is EFM (Eight to Fourteen Modulation)-modulated and supplied from a data encoder 160, and to write the recorded data, under the control of a control portion (not shown).

An analog front end portion 120 detects an wobble signal (that is, a signal corresponding to a wobble on the optical disc 5) having a frequency of 22.05 kHz (in the case that the linear velocity is set at a single speed (in the following cases, the linear velocity is set in the same way)), and then outputs the wobble signal to an ATIP decoder 130.

The ATIP decoder 130 demodulates obtains wobble signals supplied from the analog front end portion 120 to thereby obtain ATIP information and time information on the optical disc. Moreover, the ATIP decoder 130 extracts an ATIP clock signal having a frequency of 6.3 kHz.

A PLL circuit 140 employs an ATIP clock signal, which is supplied from the ATIP decoder 130, as a reference signal, and outputs a clock signal, which has a frequency that is a multiple of the frequency of the reference signal, to a frequency divider 150.

The frequency divider 150 frequency-divides a clock signal, which is outputted from the PLL circuit 140, with a predetermined frequency division ratio, and then outputs a resultant signal to a data encoder 160 as a recording clock signal having a frequency of 4.3218 MHz (incidentally, the linear velocity is equivalent to a single speed).

The data encoder 160 adds data, which is represented by an error detection signal, to recording data outputted sent from a host computer, and then encodes resultant data and performs an EFM thereon. Subsequently, the data encoder 160 outputs the recorded data, on which an EFM has been performed, to the optical head 110 in response to a recording clock signal outputted from the frequency divider 150.

Thus, the optical disc recording apparatus 100 writes recording data according to a recording clock signal obtained by using an ATIP clock signal as a reference signal.

However, in the case that the rotation of the optical disc 5 is disturbed owing to vibrations and blemishes on the disc 5, and that a malfunction of a servo circuit (not shown) for controlling the rotation of the optical disc 5 occurs, the positional deviation between the ATIP information and the recorded data occurs.

Such a positional deviation is accumulated without being corrected until the writing of the recording data is completed. Thus, in the case that such a positional deviation frequently occurs, the optical disc recording apparatus has encountered the problem that the positional deviation exceeds a tolerance defined by standard specifications (for example, Orange Book standards) for CDs.

SUMMARY OF THE INVENTION

The invention is accomplished in view of the aforementioned circumstances. Accordingly, an object of the invention is to provide an optical disc recording apparatus enabled to detect a positional deviation occurring between ATIP information and recording data and to correct the positional deviation, and is also to provide a control method therefor.

In order to solve the aforesaid object, the invention is characterized by having the following arrangement.

(1) An optical disc recording apparatus comprising:

a recording clock generating unit for generating a recording clock signal for controlling timing with which recording data to be recorded on an optical disc is written thereto;

a first detecting unit for detecting an ATIP synchronization signal from ATIP information preliminarily recorded on the optical disc;

a second detecting unit for detecting a recording data synchronization signal to be added to the recorded data at predetermined intervals;

a third detecting unit for detecting a difference between the ATIP synchronization signal and the recording data synchronization signal; and a phase control unit for controlling aphase of a recording clock signal, generated from the recording clock generating unit, according to the phase difference detected by the third detecting unit.

(2) The optical disc recording apparatus according to (1), wherein when the phase difference is detected by the third detecting unit, the phase control unit changes the phase of the recording clock signal so that a phase difference detected next time by the third detecting unit is less than the phase difference detected this time.

(3) The optical disc recording apparatus according to (2), wherein the phase control unit changes the phase of the recording clock signal so that the phase difference detected by the third detecting unit stepwisely decreases.

(4) The optical disc recording apparatus according to (1), wherein the first detecting unit detects the ATIP synchronization signal from the ATIP information and generates an ATIP clock signal, the recording clock generating unit includes a PLL circuit adapted to use the ATIP clock signal as a reference signal, and to output a clock signal, whose frequency is a multiple of a frequency of the reference signal, as the recording clock signal, and the phase control unit determines according to the phase difference detectedby the third detecting unit what the multiple, by which the frequency of the reference signal is multiplied, is.

(5) The optical disc recording apparatus according to (1), wherein the first detecting unit detects the ATIP synchronization signal from the ATIP information and generates an ATIP clock signal, the recording clock generating unit comprises:
a phase correction circuit for receiving the ATIP clock signal and performing phase correction on the received ATIP clock signal; and
a PLL circuit adapted to use the ATIP clock signal, subjected to the phase correction by the phase correction circuit, as a reference signal, and to output a clock signal, whose frequency is a multiple of a frequency of the reference signal, as the recording clock signal, and the phase control unit determines a correction amount used in the phase correction according to the phase difference detected by the third detecting unit.

(6) The optical disc recording apparatus according to claim 1 further comprising an oscillator for generating a clock signal having a predetermined frequency, wherein the recording clock generating unit comprises: a phase correction circuit for receiving the clock signal and performing phase correction on the received clock signal; and a PLL circuit adapted to use the clock signal, subjected to the phase correction by the phase correction circuit, as a reference signal, and to output a clock signal, whose frequency is a multiple of a frequency of the reference signal, as the recording clock signal, and wherein the phase control unit determines a correction amount used in the phase correction according to the phase difference detected by the third detecting unit.

(7) A method of controlling an optical disc recording apparatus which controls timing with which recording data to be recorded on an optical disc in response to a recording clock signal, the method comprising:

a first detection step of detecting an ATIP synchronization signal from ATIP information preliminarily recorded on the optical disc;

a second detection step of detecting a recording data synchronization signal to be added to the recorded data at predetermined intervals;

a third detection step of detecting a difference between the ATIP synchronization signal and the recording data synchronization signal; and a phase control step of controlling a phase of a recording clock signal according to the phase difference detected at the third detection step.

BRIEF DESCRIPTION OF THE DRAWINGS

FIG. 18 is a view illustrating the configuration of a conventional optical disc recording apparatus.

DETAILED DESCRIPTION OF PREFERRED EMBODIMENTS

Hereinafter, embodiments of the invention are described with reference to the accompanying drawings.

A. First Embodiment (1) The Configuration of First Embodiment

Figure 1:
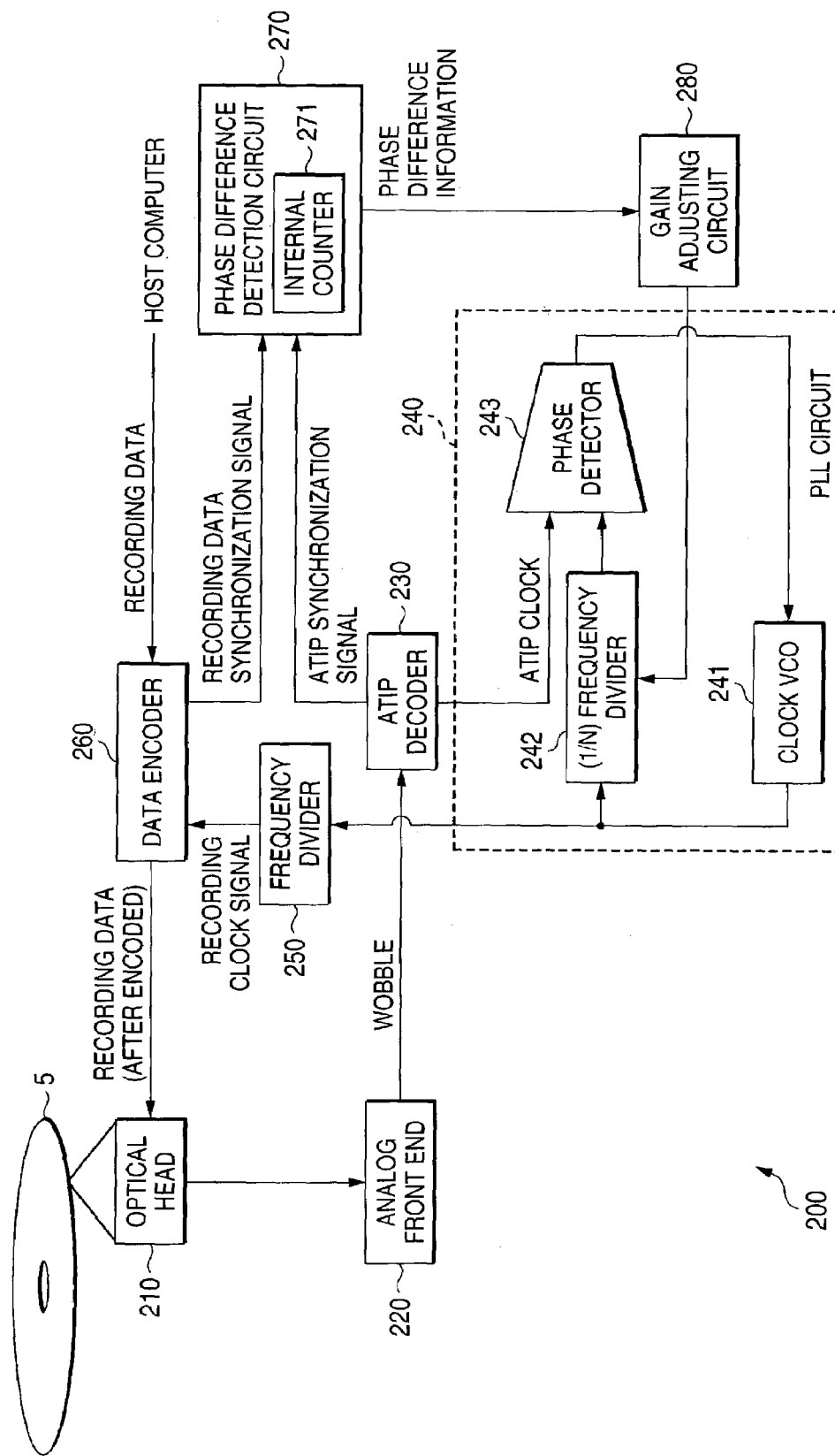
FIG. 1 is a block view illustrating the configuration of an optical disc recording apparatus that is a first embodiment of the invention.

FIG. 1 is a block view illustrating the configuration of an optical disc recording apparatus 200 according to the first embodiment. Incidentally, the optical disc recording apparatus 200 shown in FIG. 1 is nearly similar to the optical disc recording apparatus 100 shown in FIG. 18, except that the optical disc recording apparatus 200 has a phase difference detection circuit 270 and a gain adjusting circuit 280, and that an operation of an ATIP decoder 230 differs from an operation of the ATIP decoder 130. Therefore, the following description is concentrated on the differences between the optical disc recording apparatuses 100 and 200.

When the ATIP decoder 230 receives a wobble signal having a frequency of 22.05 kHz (in the case that the linear velocity is set at a single speed (in the following cases, the linear velocity is set in the same way)), and then demodulates the wobble signal, as described above. Thus, the ATIP decoder 230 obtains ATIP information and generates an ATIP clock signal having a frequency of 6.3 kHz and then outputs the ATIP clock signal to a PLL circuit 240. On the other hand, the ATIP decoder 230 generates an ATIP synchronization signal having a frequency of 75 Hz from synchronization information included in the ATIP information, and then outputs this ATIP synchronization signal to a phase difference detection circuit 270.

A data encoder 260 adds an error detection signal and a synchronization (hereunder referred to a recording data synchronization signal) to recording data sent from a host computer, and then performs FM-demodulation thereon. Then, the data decoder 260 outputs a resultant signal to an optical head 210 in response to a recording clock signal supplied from a frequency divider 250. On the other hand, the data encoder 260 outputs the recording data synchronization signal having a frequency of 75 Hz to a phase difference detection circuit 270.

Figure 2:
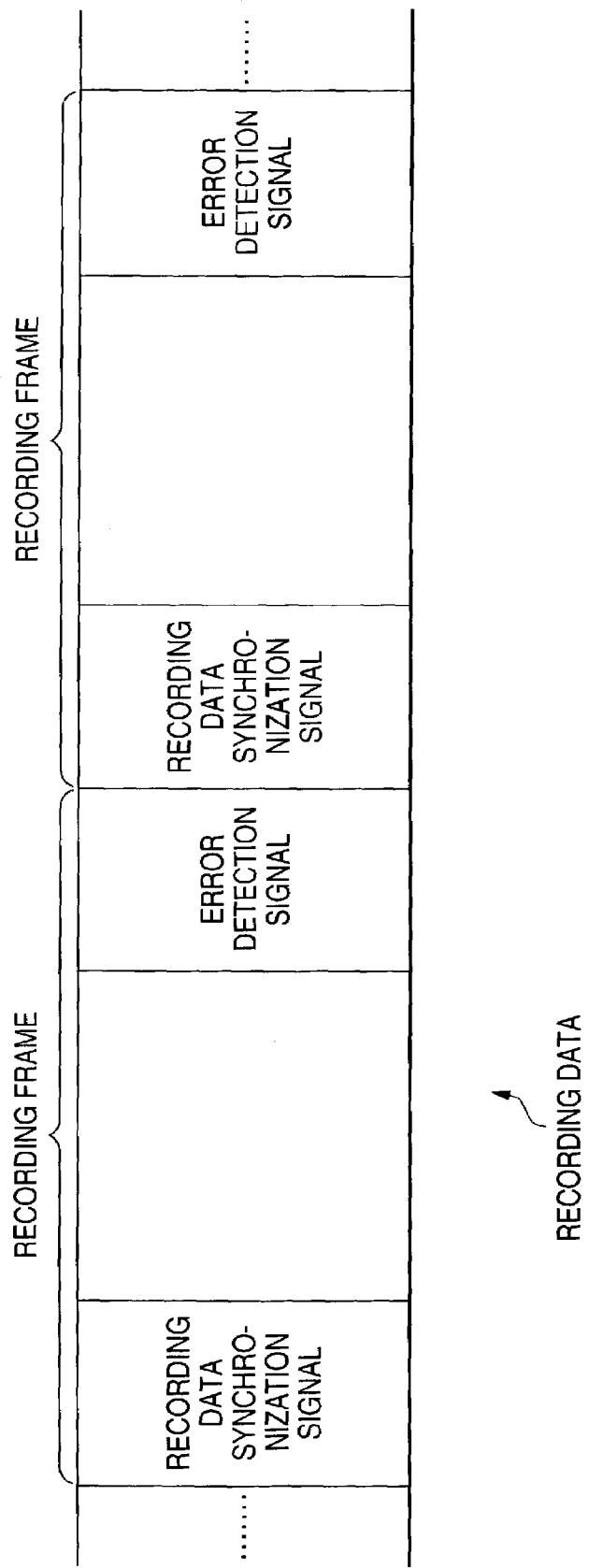
FIG. 2 is a view illustrating recording data according to the first embodiment.

FIG. 2 is a view illustrating recording data outputted from the data encoder 260.

Recording data outputted from the data encoder 260 consists of a plurality of fixed-length recording frames (hereunder referred to simply as recording frames), each of which has an error detection signal and a recording data synchronization signal added at predetermined positions. The data encoder 260 completes output of each recording frames every time when a predetermined number of recording clock signals are inputted from the frequency divider 250 thereto.

Turning back to FIG. 1 again, the phase difference detection circuit 270 compares the phase of the ATIP synchronization signal, which is supplied from the ATIP decoder 230, with that of the recording data synchronization signal outputted from the data encoder 260, and then outputs a signal representing a result of the comparison to the gain adjusting circuit 280 as a signal representing phase difference information.

Figure 3:
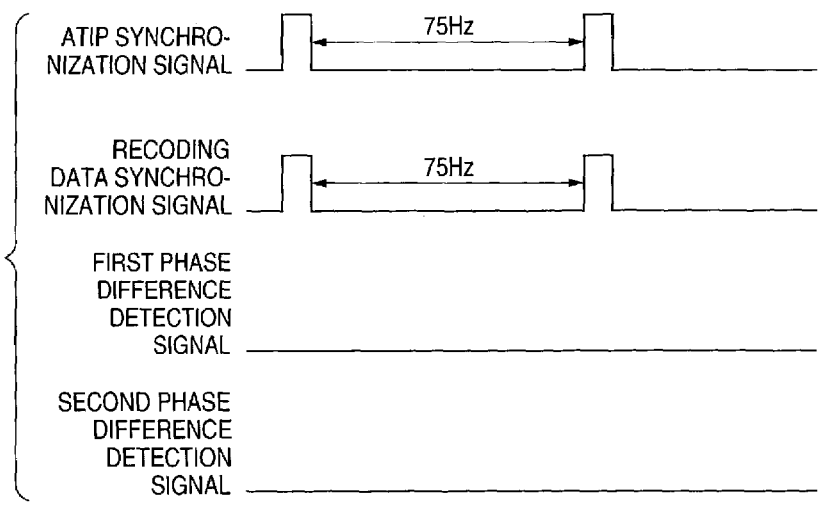
FIG. 3 is a graph illustrating the relation between an ATIP synchronization signal and a recording data synchronization signal according to the first embodiment.
Figure 4:
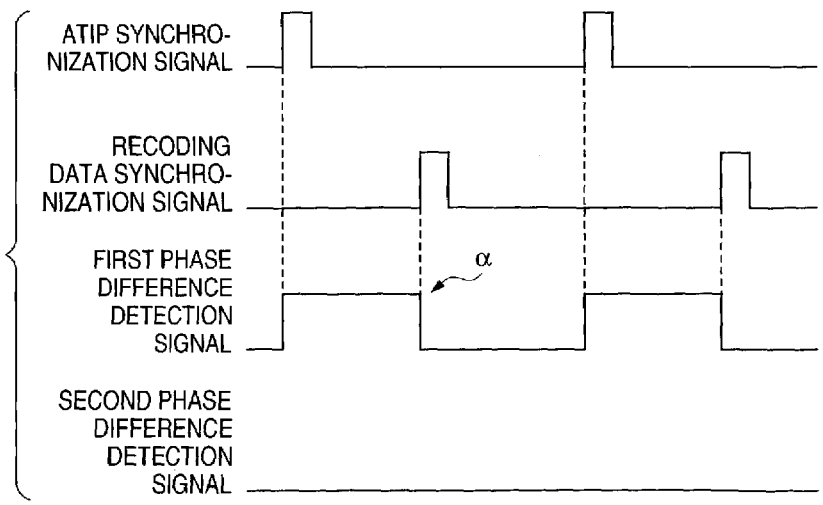
FIG. 4 is a graph illustrating the relation between an ATIP synchronization signal and a recording data synchronization signal according to the first embodiment.
Figure 5:
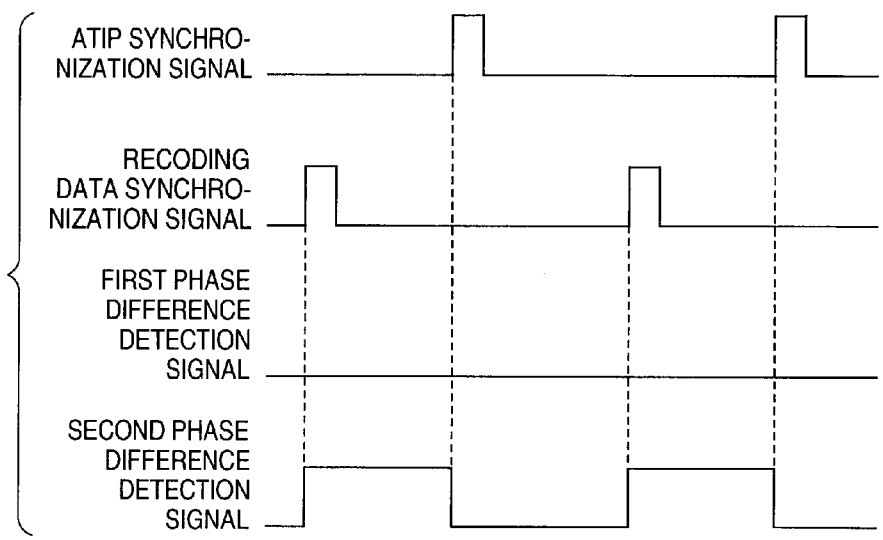
FIG. 5 is a graph illustrating the relation between an ATIP synchronization signal and a recording data synchronization signal according to the first embodiment.

FIGS. 3 to 5 are graphs respectively illustrating the cases that no phase deviation between the ATIP synchronization signal and the recording data synchronization signal occurs, that the phase of the ATIP synchronization signal leads the phase of the recording data synchronization signal, and that the phase of the recording data synchronization signal leads the phase of the ATIP synchronization signal. Incidentally, the first phase difference detection signal shown in FIGS. 3 to 5 indicates how much the phase of the ATIP synchronization signal leads the phase of the recording data synchronization signal. The second phase difference detection signal indicates how much the phase of the recording data synchronization signal leads the phase of the ATIP synchronization signal.

As illustrated in FIG. 3, in the case that the no deviation between the phase of the ATIP synchronization signal and the phase of the recording data synchronization signal occurs, each of the first phase difference detection signal and the second phase difference detection signal maintains a low level. In contrast, when the rotation of the optical disc 5 is disturbed by scratches formed on the optical disc 5, a deviation between the phase of the ATIP synchronization signal and that of the recording data synchronization signal occurs. Practically, as illustrated in FIG. 4, in the case that the phase of the ATIP synchronization signal leads the phase of the recording data synchronization signal, the first phase difference detection signal maintains a high level until a recording data synchronization signal is detected since an ATIP synchronization signal is detected. Conversely, as illustrated in FIG. 5, the second phase difference detection signal maintains a high level until an ATIP synchronization signal is detected since a recording data synchronization signal is detected.

The phase difference detection circuit 270 detects the first phase difference detection signal and the second phase difference detection signal. When the phase difference detection circuit 270 detects that one of the phase difference detection signals rises from a low level to a high level, the circuit 270 activates an internal counter 271.

Figure 6:
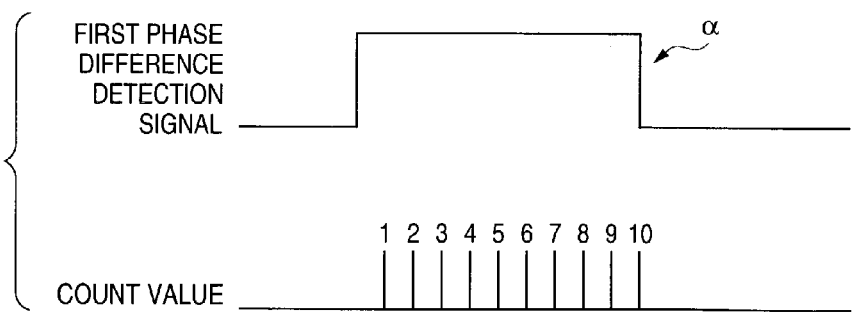
FIG. 6 is a graph illustrating an operation of an internal counter according to the first embodiment.

FIG. 6 is a graph illustrating an operation of the internal counter 271. Incidentally, α indicated in FIG. 6 corresponds to α indicated in FIG. 4.

The internal counter 271 performs a counting operation in a time period, during which one of the first phase difference detection signal and second phase difference detection signal maintains a high level, according to a system clock signal supplied from a control portion (not shown) under the control of the phase difference detection circuit 270. For example, in the case illustrated in FIG. 6, the internal counter 271 counts system clock signals in a time period during which the first phase difference detection signal maintains a high level. This count value corresponds to the time period during which the first or second phase difference detection signal maintains a high level. When the internal counter 271 finishes counting, the phase difference detection circuit 270 generates phase difference information including a result ("10" in the case illustrated in FIG. 6) of the counting performed by the internal counter 271 and a kind (in the case illustrated in FIG. 6, the first phase difference detection signal) of the phase difference detection signal to be measured in the time period during which the high level is maintained. Further, the phase difference detection circuit 270 outputs a signal representing the phase difference information to the gain adjusting circuit 280 (see FIG. 1).

The gain adjusting circuit 280 suitably adjusts the frequency division ratio employed by a frequency divider 250 according to the phase difference information supplied from the phase difference detection circuit 270 (incidentally, the details of this operation will be described later).

The PLL circuit 240 employs an ATIP clock signal, which is supplied from the ATIP decoder 230, as a reference signal and is a circuit (what is called a frequency multiplier) for outputting a clock signal, whose frequency is a multiple of the frequency (hereunder referred to as a reference frequency) of the reference signal. The PLL circuit 240 has a clock VCO (Voltage Controlled oscillator), a (1/N)-frequency-divider 242, and a phase detector 243.

The clock VCO 241 is a clock oscillator, whose oscillating frequency is controlled by a phase difference signal outputted from the phase detector 243.

The (1/N)-frequency-divider 242 frequency-divides the clock signal outputted from the clock VCO 241 into the (1/N) the frequency thereof, and outputs a resultant signal to the phase detector 243 as a comparison signal. Furthermore, the frequency division ratio (=1/N) of this (1/N)-frequency-divider can suitably be adjusted by the gain adjusting circuit 280.

The phase detector 243 detects the phase difference between the ATIP clock signal (that is, the reference signal) outputted from the ATIP decoder 230 and the comparison signal outputted from the (1/N)-frequency-divider 242, and then outputs a signal representing a result of the detection to the clock VCO 241 as a phase difference signal.

Thus, the clock VCO 241 outputs a clock signal, whose frequency is obtained by multiplying the reference frequency of a signal, which is outputted from the clock VCO 241, by N. After this clock signal is frequency-divided by the frequency divider 250 with a predetermined frequency division ratio, a resultant signal is supplied to the data encoder 260 as the recording clock signal. The data encoder 260 outputs recording data to the optical head 210 in response to the recording clock signal supplied from the frequency divider 250. Thus, the recording data is written to the optical disc 5.

Hereinafter, operations of the optical disc recording apparatus 200 according to the invention are described by separately describing an operation thereof in a case, in which no positional deviation between ATIP information and recording data occurs, and another operation thereof in a case in which a positional deviation therebetween occurs.

Figure 7:
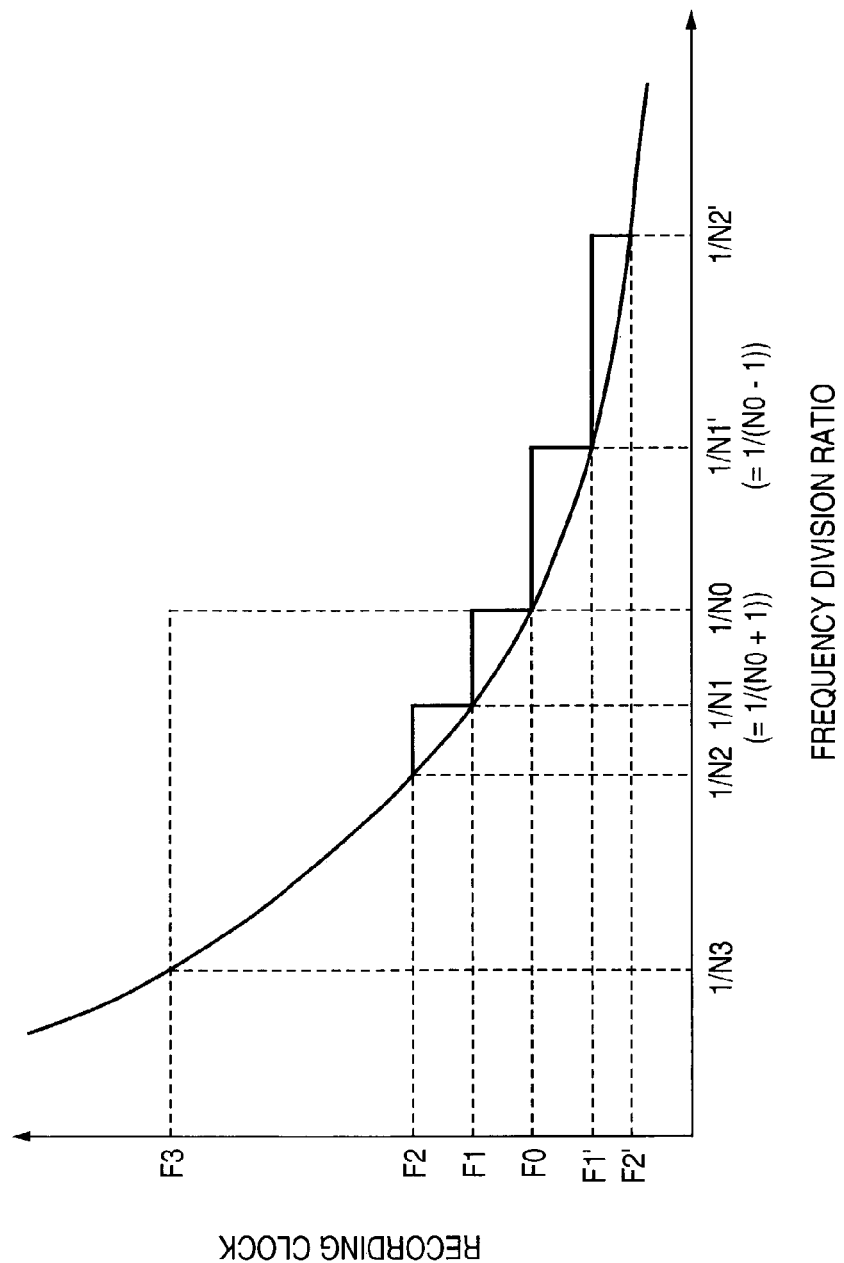
FIG. 7 is a graph illustrating the relation between a frequency division ratio and a frequency of a recording clock signal according to the first embodiment.

(2) Operations of Embodiment a. In the case that no positional deviation between ATIP information and recording data occurs:

FIG. 7 is a graph illustrating the relation between the frequency division ratio, which is set in the (1/N)-frequency-divider 242, and the frequency of the recording clock signal. Incidentally, the frequency division ratio (1/N0) and the frequency F0 of the recording clock signal shown in FIG. 7 are those set in the case that no deviation between the phase of the ATIP synchronization signal and the phase of the recording data synchronization signal occurs.

As illustrated in FIG. 7, as the set frequency division ratio increases, the frequency of the recording clock signal stepwisely decreases. When the gain adjusting circuit 280 decides according to the phase difference information supplied from the phase difference detection circuit 270 that no deviation between the phase of the ATIP synchronization signal and the phase of the recording data synchronization signal occurs (see FIG. 3), the gain adjusting circuit 280 sets the frequency division ratio at (1/N0). During the gain adjusting circuit 280 receives the phase difference information indicating that no deviation therebetween occurs, the gain adjusting circuit 280 holds the frequency division ratio at (1/N0). Thus, the recording clock signal, whose frequency is held at a constant frequency F0, is supplied from the frequency divider 250 to the data encoder 260, so that writing of the recording data is performed without deviation between the ATIP information and the recording data.

b. In the case that a positional deviation between ATIP information and recording data occurs:

i) Where the phase of the ATIP synchronization signal leads the phase of the recording data synchronization signal:

When the gain adjusting circuit 280 decides according to the phase difference information supplied from the phase difference detection circuit 270 that the phase of the ATIP synchronization phase leads the phase of the recording data synchronization signal (see FIG. 4), the gain adjusting circuit 280 refers to a result of the counting, which is included in the phase difference circuit, and determines the frequency division ratio set in the (1/N)-frequency-divider 242 so that the phase deviation is corrected.

Figure 8:
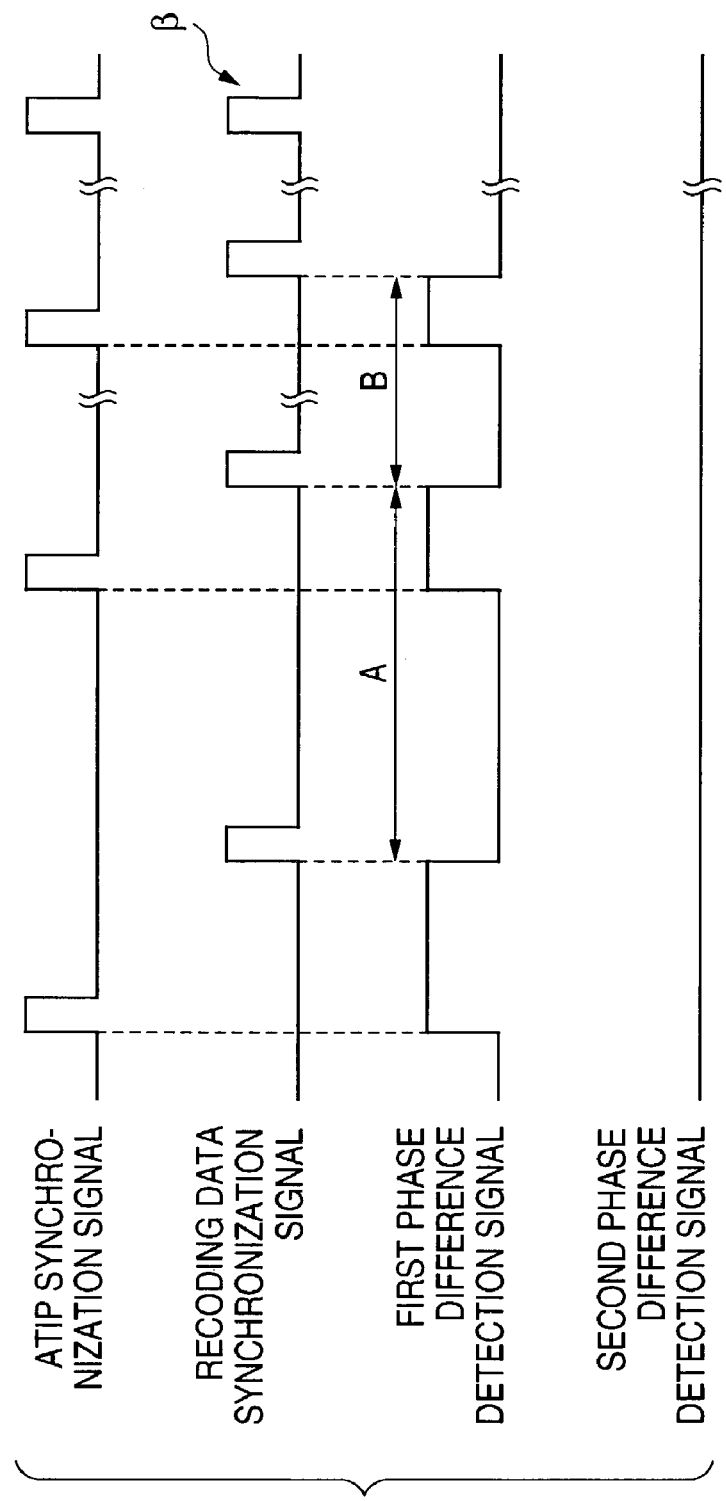
FIG. 8 is a graph illustrating an operation of a gain adjusting circuit according to the first embodiment.
Figure 9:
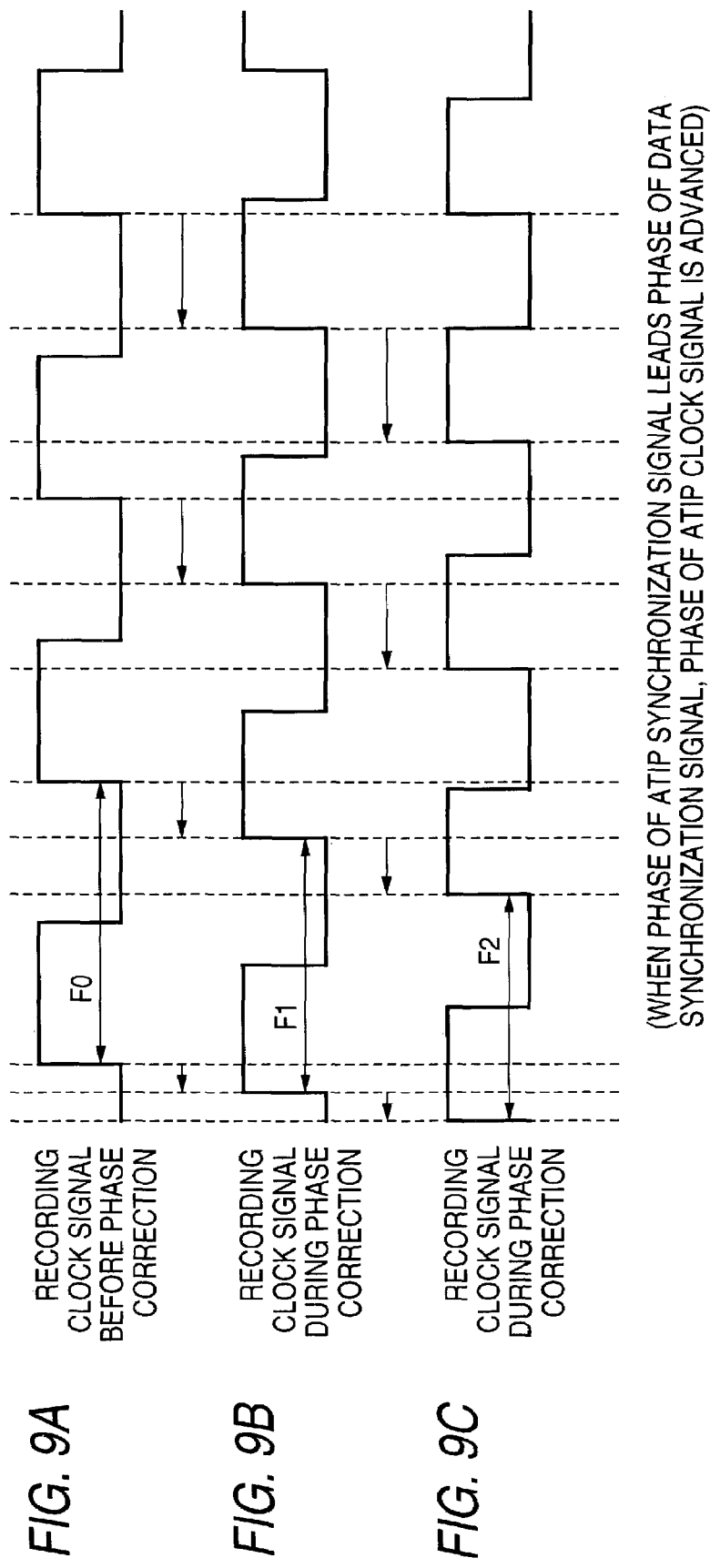
FIGS. 9A to 9C are charts illustrating a change in the frequency of the recording clock signal according to the first embodiment.

FIG. 8 is a graph illustrating an operation of the gain adjusting circuit 280. FIGS. 9A to 9C are charts illustrating a change in the frequency of the recording clock signal.

When the gain adjusting circuit 280 receives phase difference information from the phase detection circuit 270, which indicates that the phase of the ATIP synchronization signal leads the phase of the recording data synchronization signal by, for instance, 10 counts (see FIG. 6), the gain adjusting circuit 280 determines a frequency division ratio to be set in the (1/N)-frequency-divider 242 by utilizing a function (see FIG. 7) of the frequency division ratios and the frequency of the recording clock signal, which is stored in a memory (not shown), so as to correct the phase deviation. As illustrated in FIG. 8, in this case, the phase of the ATIP synchronization signal leads the phase of the recording data synchronization signal. Thus, the gain adjusting circuit 280 sets the frequency division ratio at 1/N1 (<1/N0) in the (1/N)-frequency-divider 242 so as to set the frequency of the recording clock signal at a value (for example, F1), which is higher than F0 (see FIG. 8A).

Particularly speaking, when the gain adjusting circuit 280 receives the phase difference information indicating that the phase of the ATIP synchronization signal leads the phase of the recording data synchronization signal, the gain adjusting circuit 280 changes the frequency division ratio to be set in the (1/N)-frequency-divider 242 from 1/N0 to 1/N1 (=1/(N0+1)). Conversely, when the gain adjusting circuit 280 receives the phase difference information indicating that the phase of the recording data synchronization signal leads the phase of the ATIP synchronization signal, the gain adjusting circuit 280 changes the frequency division ratio to be set in the (1/N)-frequency-divider 242 from 1/N0 to 1/N1' (=1/(N0−1)) (see FIG. 7).

Thus, it is possible to uniquely determine the frequency division ratio to be set in the (1/N)-frequency-divider, without taking the magnitude of the phase deviation into consideration. However, it is also possible that the frequency of the recording clock signal is changed from F0 to F3 at a stretch by changing the frequency division ratio, which is set in the (1/N)-frequency-divider 242, from 1/NO to 1/n3 (<1/N1<1/N0) (see FIG. 7). Nevertheless, in the case that the frequency of the recording clock signal is drastically changed, the apparatus encounters the problem that recording quality is degraded. In view of such circumstances, it is preferable to preliminarily find a range of frequency division ratios to be set, at which the recording quality is not degraded, and to change the frequency division ratio in this range.

Meanwhile, when the frequency division ratio to be set in the (1/N)-frequency-divider is changed from 1/N0 to 1/N1, the frequency of the recording clock signal is changed from F0 to F1 (>F0), so that the phase of the recording clock signal is advanced (see FIGS. 9A TO 9B). By the way, the data encoder 260 completes output of each recording frame each time when a predetermined number of recording clock signals are inputted from the frequency divider 250 thereto. Thus, time required to complete output of one frame (hereunder referred to a frame read time) becomes shorter than the frame read time in the case of setting the frequency of the recording clock signal at F0. At that time, the data encoder 260 reads a recording data synchronization signal added to a predetermined position in a recording frame with timing quicker than that in the case of setting the frequency of the recording clock signal at F0 and outputs the read signal to the phase difference detection circuit 270.

Consequently, the magnitude of the deviation caused between the phase of the TIP synchronization signal and the phase of the recording data synchronization signal, which is detected in the phase detection circuit 270, becomes small, as compared with the magnitude of the deviation detected in the phase detection circuit 270 the last time. Similarly as the circuit 270 in the aforementioned case, the phase detection circuit 270 compares the phase of the ATIP synchronization signal, which is outputted from the ATIP decoder 230, with that of the recording data synchronization signal outputted from the data encoder 260. Subsequently, the phase detection circuit 270 outputs a result of the comparison to the gain adjusting circuit 280 as phase difference information. When the gain adjusting circuit 280 receives the subsequent phase difference information from the phase difference detection circuit 270, the gain adjusting circuit 280 determines the frequency division ratio to be set in the (1/N)-frequency-divider 242, similarly as the circuit 280 in the aforementioned case.

When the gain adjusting circuit 280 detects that, for example, a count value "10" is included in the phase difference information received the last time, and that, for instance, a count value "7" is included in the phase difference information received this time, the gain adjusting circuit 280 changes the frequency division ratio from 1/N1 to 1/N2 (<1/N1) (see FIG. 7) in a time period until the next ATIP synchronization signal and the next recording data synchronization signal are detected (see B shown in FIG. 8).

Consequently, the frequency of the recording clock signal is changed from F0 to F2 through F1, so that the phase of the recording clock signal stepwisely changes (see FIGS. 9A, 9B, and 9C).

During such a process is repeatedly performed, when the phase detection circuit 270 detects that no deviation occurs between the phase of the ATIP synchronization signal supplied from the ATIP decoder 230 and the phases of the recording data synchronization signal outputted from the data encoder 260 (see β in FIG. 8), the circuit 270 outputs phase difference information, which indicates that no phase deviation therebetween occurs (that is, the count value is "0") to the gain adjusting circuit 280.

When deciding according to the phase difference information received from the phase difference detection circuit 270 that the phase deviation is eliminated, the gain adjusting circuit 280 holds the frequency division ratio (for example, 1/N2) set in the (1/N)-frequency-divider 242 at this time. Consequently, the frequency of the clock signal is held at the frequency (for instance, F2) set at this time. Thus, a recording clock signal, whose frequency is held at the constant frequency F2, is supplied from the frequency divider 250 to the data encoder 260, so that writing of data is performed without deviation between the ATIP information and the recording data. Incidentally, an operation to be performed in the case of thereafter causing the deviation between the phase of the ATIP synchronization signal and that of the recording data synchronization signal once again can be explained, similarly as the operation in the aforementioned case. Therefore, the description of such an operation to be performed in the case of thereafter causing the deviation therebetween is omitted herein.

ii) Where the phase of the recording data synchronization signal leads the phase of the ATIP synchronization signal:

On the other hand, when deciding according to the phase difference information supplied from the phase difference detection circuit 270 that the phase of the recording data synchronization signal leads the phase of the ATIP synchronization signal (see FIG. 5), the gain adjusting circuit 280 refers to a result of the counting, which is included in the phase difference information, and determines the frequency division ratio to be set in the (1/N)-frequency-divider 242 so as to correct the phase deviation.

Figure 10:
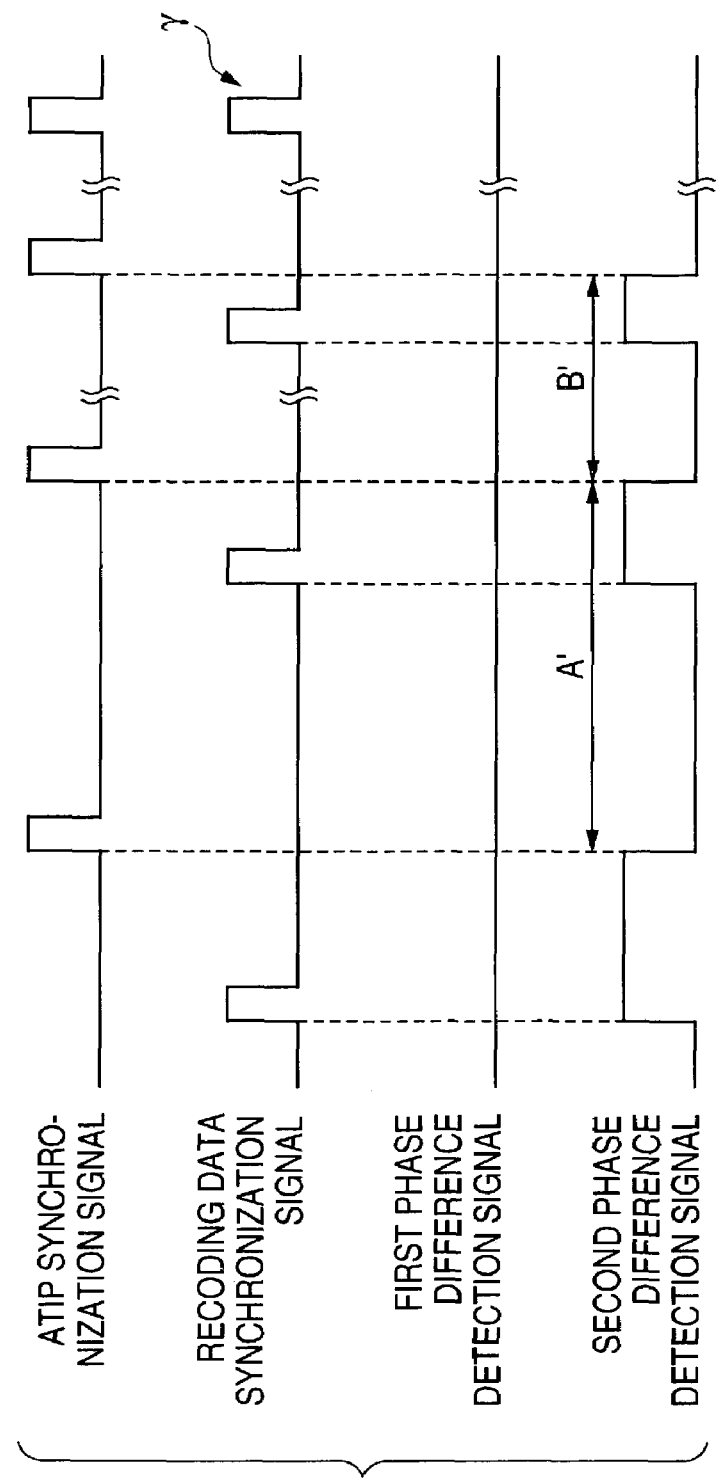
FIG. 10 is a graph illustrating an operation of the gain adjusting circuit according to the first embodiment.
Figure 11:
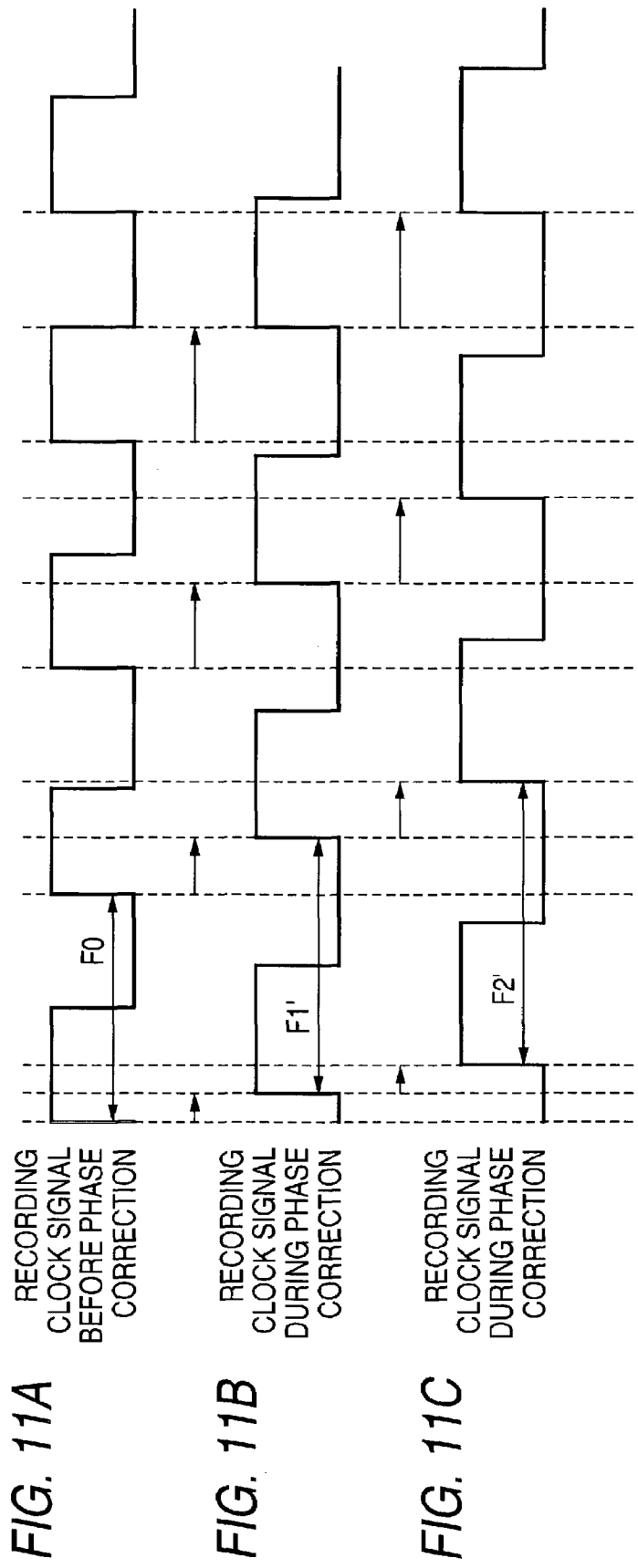
FIGS. 11A to 11C are charts illustrating a change in the frequency of the recording clock signal according to the first embodiment.

FIG. 10 is a chart illustrating an operation of the gain adjusting circuit 280. FIGS. 11A to 11C are graphs each illustrating a change in the frequency of a recording clock signal.

When the gain adjusting circuit 280 receives phase difference information from the phase detection circuit 270, which indicates that the phase of the recording data synchronization signal leads the phase of the ATIP synchronization signal by, for instance, 10 counts, the gain adjusting circuit 280 determines a frequency division ratio to be set in the (1/N)-frequency-divider 242 by utilizing a function (see FIG. 7) of the frequency division ratios and the frequency of the recording clock signal, which is stored in a memory (not shown), so as to correct the phase deviation. As illustrated in FIG. 10, in this case, the phase of there cording data synchronization signal leads the phase of the ATIP synchronization signal. Thus, the gain adjusting circuit 280 sets the frequency division ratio at 1/N1' (=1/(N0+1)), which is higher than (1/N0), in the (1/N)-frequency-divider 242 (see A' shown in FIG. 10) so as to set the frequency of the recording clock signal at a value (for example, F1'), which is lower than F0 (see FIG. 7). Incidentally, the operation of the gain adjusting circuit 280 and the reason for not permitting the frequency division ratio, which is set in the (1/N)-frequency-divider 242, to largely change can be described similarly as those in the aforementioned case. Therefore, the description of the operation and such a reason is omitted herein.

Consequently, the frequency of the recording clock signal is changed from F0 to F1' (<F0), so that the phase of the recording clock signal is delayed (see FIGS. 11A TO 11B). As described above, the data encoder 260 completes output of each recording frame each time when a predetermined umber of recording clock signals are inputted from the frequency divider 250 thereto. Thus, the time required to complete output of one frame (hereunder referred to a frame read time) becomes longer than the frame read time in the case of setting the frequency of the recording clock signal at F0. At that time, the data encoder 260 reads a recording data synchronization signal added to a predetermined position in a recording frame with timing slower than that in the case of setting the frequency of the recording clock signal at F0 and outputs the read signal to the phase difference detection circuit 270. When receiving the subsequent phase difference information from the phase difference detection circuit 270, the gain adjusting circuit 280 determines the frequency division ratio to be set in the (1/N)-frequency-divider 242, similarly as the circuit 280 in the aforementioned case.

When detecting that, for example, a count value "10" is included in the phase difference information received the last time, and that, for instance, a count value "7" is included in the phase difference information received this time, the gain adjusting circuit 280 changes the frequency division ratio from 1/N1' to 1/N2' (>1/N1') (see FIG. 7) in a time period until the next ATIP synchronization signal and the next recording data synchronization signal are detected (see B' shown in FIG. 10).

Consequently, the frequency of the recording clock signal is changed from F0 to F2' through F1', so that the phase of the recording clock signal stepwisely changes (see FIGS. 11A, 11B, and 11C).

During such a process is repeatedly performed, when the phase detection circuit 270 detects that no deviation occurs between the phase of the ATIP synchronization signal supplied from the ATIP decoder 230 and the phases of the recording data synchronization signal outputted form the data encoder 260 (see γ in FIG. 10), the circuit 270 outputs phase difference information, which indicates that no phase deviation therebetween occurs (that is, the count value is "0") to the gain adjusting circuit 280.

When deciding according to the phase difference information received from the phase difference detection circuit 270 that the phase deviation is eliminated, the gain adjusting circuit 280 holds the frequency division ratio (for example, 1/N2') set in the (1/N)-frequency-divider 242 at this time. Consequently, the frequency of the clock signal is held at the frequency (for instance, F2') set at this time. Thus, a recording clock signal, whose frequency is held at the constant frequency F2', is supplied from the frequency divider 250 to the data encoder 260, so that writing of data is performed without deviation between the ATIP information and the recording data. Incidentally, an operation to be performed in the case of thereafter causing the deviation between the phase of the ATIP synchronization signal and that of the recording data synchronization signal once again can be explained, similarly as the operation in the aforementioned case. Therefore, the description of such an operation to be performed in the case of thereafter causing the deviation therebetween is omitted herein.

As described above, according to the optical disc recording apparatus 200 of the first embodiment, the positional deviation caused between the ATIP information and the recording data can be corrected by controlling the frequency of the recording clock signal outputted from the clock VCO 241 through the frequency divider 250. This prevents an occurrence of the problem that the positional deviation exceeds a tolerance defined by standard specifications (for example, Orange Book standards) for CDs.

Furthermore, when correcting the phase deviation between the ATIP synchronization signal and the recording data synchronization signal, the gain adjusting circuit 280 changes the frequency division ratio to be set in the (1/N)-frequency-divider 242, so that the phase deviation is stepwisely corrected. That is, the phase deviation is corrected without abruptly changing the frequency division ratio to be set in the (1/N)-frequency-divider 242. Thus, this embodiment can prevent an occurrence of the problem that the recording quality is degraded.

In other words, for example, even when a large phase deviation between the phase of the ATIP synchronization signal and the recording data synchronization signal is detected, the positional deviation between the ATIP information and the recording data can be corrected in a short time by stepwisely changing the frequency division ratio of the (1/N)-frequency-divider 242. That is, the employment of a method of stepwisely changing the frequency division ratio of the (1/N)-frequency-divider 242 enables the apparatus to stepwisely change the frequency of the recording clock signal. Thus, as compared with the case of holding the frequency division ratio, which is set in the (1/N)-frequency-divider 242, at a constant value without stepwisely changing the frequency division ratio to be set in the (1/N)-frequency-divider 242, the time required to complete the correction of the positional deviation can be reduced. Incidentally, the number of stages, at which the frequency division ratio is stepwisely changed, and the timing, with which the frequency division ratio is changed, can suitably be changed according to the design of the optical disc recording apparatus.

First Modification

FIGS. 12A to 12D are charts illustrating a change in frequency of a recording clock signal according to a first modification. FIG. 12A to 12D correspond to FIG. 9A to 9C.

When the gain adjusting circuit 280 according to this modification receives the phase difference information indicating that, for example, the phase of the ATIP synchronization signal leads the phase of the recording data synchronization signal, the gain adjusting circuit 280 according to this modification sets the frequency division ratio of the (1/N)-frequency-divider 242 at 1/N1 (<1/N0) until the next ATIP synchronization signal and the next recording data synchronization signal are detected (see A shown in FIG. 8), similarly as that of the aforementioned first embodiment. When the gain adjusting circuit 280 receives the subsequent phase difference information from the phase difference detection circuit 270, the gain adjusting circuit 280 changes the frequency division ratio, which is set in the (1/N)-frequency-divider 242, from 1/N1 to 1/N2 (<1/N1) (see FIG. 7) in a time period until the next ATIP synchronization signal and the next recording data synchronization signal are detected (see B shown in FIG. 8). Thereafter, the gain adjusting circuit 280 compares the phase difference information, which is received this time, with the phase difference information received the last time. Then, the gain adjusting circuit 280 sets the frequency division ratio, which is to be set in the (1/N)-frequency-divider 242, by changing the frequency division ratio from 1/N2 to 1/N1 again.

Figure 12:
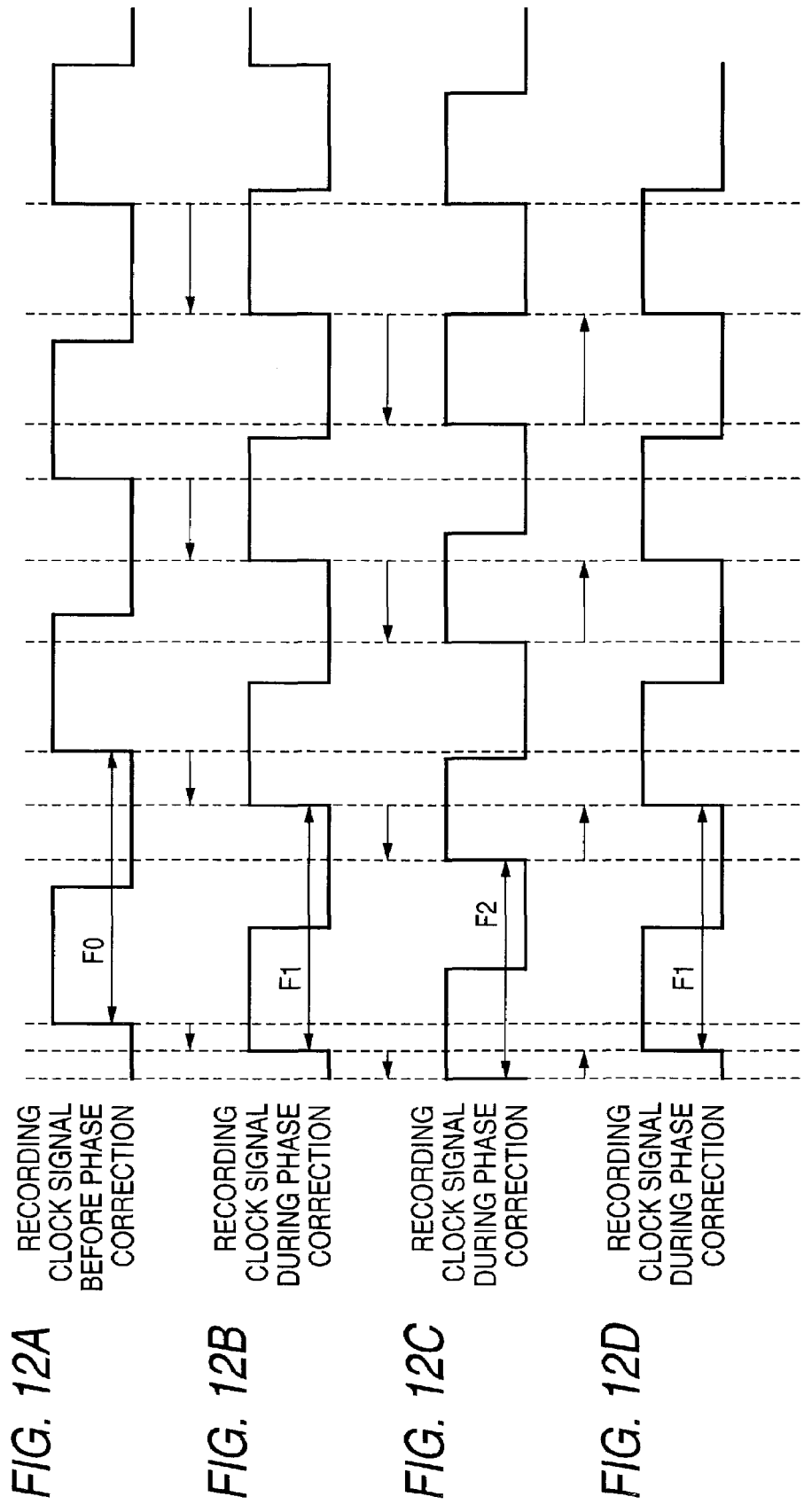
FIGS. 12A to 12D are charts illustrating a change in the frequency of a recording clock signal according to a first modification.

Consequently, the frequency of the recording clock signal is changed from F0 through F1 and F2 to F1, so that the phase of the recording clock signal stepwisely changes (see FIGS. 12A, 12B, 12 C and 12D).

Thereafter, when deciding according to the phase difference information received from the phase difference detection circuit 270 that the phase deviation is eliminated, the gain adjusting circuit 280 holds the frequency division ratio (for example, 1/N1) set in the (1/N)-frequency-divider 242 at this time. Consequently, the frequency of the clock signal is held at the frequency (for instance, F1) set at this time. Thus, a recording clock signal, whose frequency is held at the constant frequency F1, is supplied from the frequency divider 250 to the data encoder 260, so that writing of data is performed without deviation between the ATIP information and the recording data. Incidentally, an operation to be performed in the case of thereafter causing the deviation between the phase of the ATIP synchronization signal and that of the recording data synchronization signal once again can be explained, similarly as the operation in the aforementioned first embodiment. Therefore, the description of such an operation to be performed in the case of thereafter causing the deviation therebetween is omitted herein.

As described above, in the case that a deviation between the phase of the ATIP synchronization signal and the phase of the recording data synchronization signal occurs, the gain adjusting circuit 280 may correct the deviation between the phase of the ATIP synchronization signal and the phase of the recording data synchronization signal by performing the following adjusting operation, that is, once reducing the frequency division ratio to be set in the (1/N)-frequency-divider 242 (for example, changing from 1/N1 to 1/N2), and thereafter increasing the frequency division ratio (for instance, changing from 1/N2 to 1/N1).

Second Modification

Figure 13:
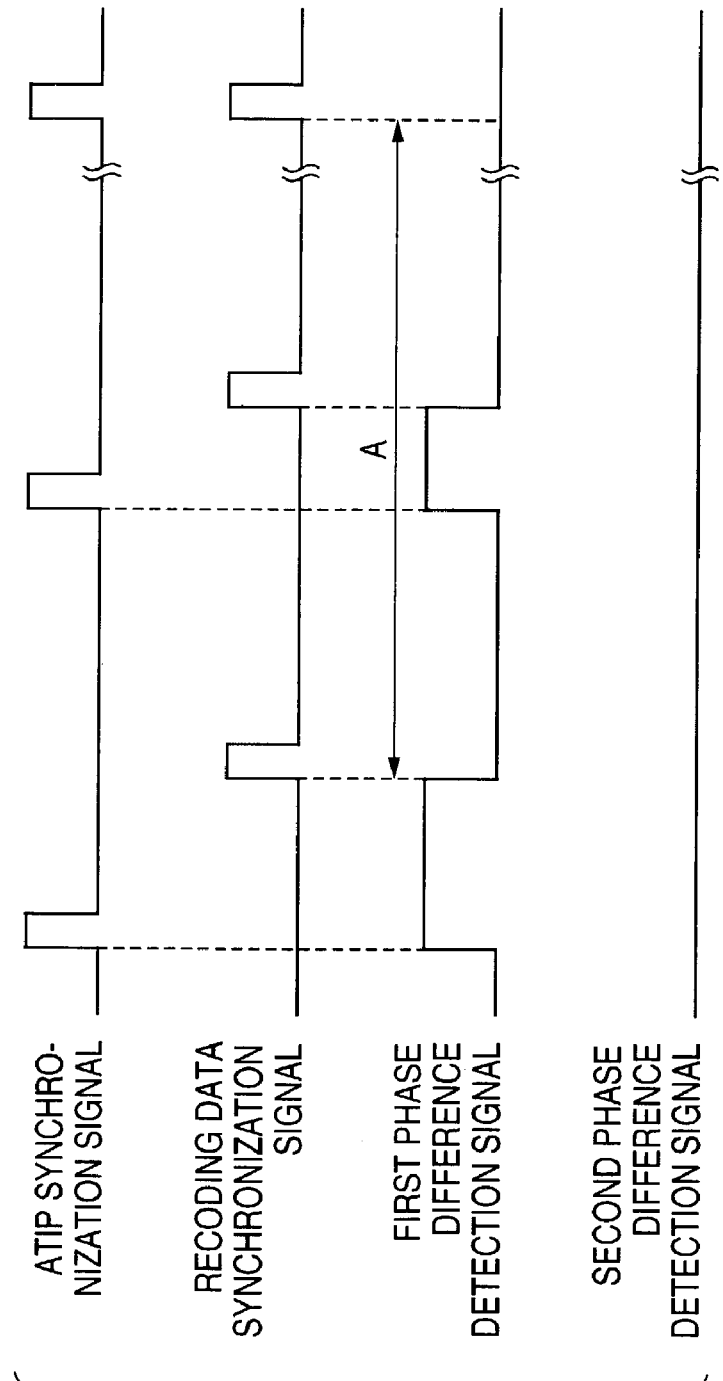
FIG. 13 is a graph illustrating an operation of a gain adjusting circuit 280 according to a second modification.
Figure 14:
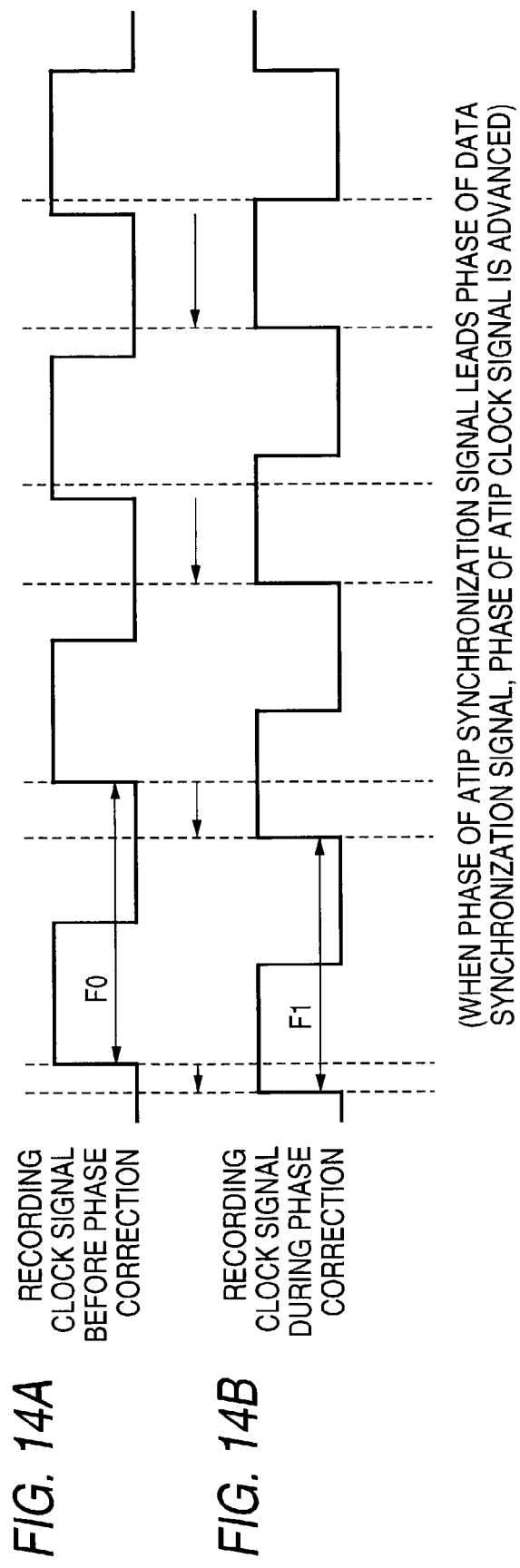
FIGS. 14A and 14B are charts illustrating a change in the frequency of a recording clock signal according to the second modification.

FIG. 13 is a graph illustrating an operation of the gain adjusting circuit 280 according to the second modification. FIGS. 14A and 14B are charts each illustrating a change in the frequency of a recording clock signal according to the second modification. Incidentally, FIG. 13 and FIGS. 14A and 14B correspond to FIG. 8 and FIGS. 9A to 9C, respectively.

When the gain adjusting circuit 280 according to this modification receives the phase difference information, which indicates that, for example, the phase of the ATIP synchronization signal leads the recording data synchronization signal, from the phase difference detection circuit 270, the gain adjusting circuit 280 holds the frequency division ratio, which is set in the (1/N)-frequency-divider 242, at a constant value (for instance, 1/N1 (<1/N0)) in a time period (see A shown in FIG. 13) until the gain adjusting circuit 280 receives the phase difference information indicating that the deviation between the phase of the ATIP synchronization signal and the phase of the recording data synchronization signal.

The frequency of the recording clock signal is changed from F0 to F1 (>F0) by changing the frequency division ratio, which is set in the (1/N)-frequency-divider 242, from 1/N0 to 1/N1. Thus, the phase of the recording clock signal is advanced (see FIG. 14A to FIG. 14B). Thereafter, when deciding according to the phase difference information received from the phase difference detection circuit 270 that the phase deviation is eliminated, the gain adjusting circuit 280 holds the frequency division ratio (for instance, 1/N1), which is set in the (1/N)-frequency-divider 242 at this time. Consequently, the frequency of the clock signal is held at the frequency (for example, F1) of the clock signal, which is set at this time). Thus, the recording clock signal, whose frequency is held at the contact frequency F1, is supplied from the frequency divider 250 to the data encoder 260, so that the writing of the data is performed without deviation between the ATIP information and the recording data. Incidentally, the apparatus may be adapted so that when deciding that the phase deviation is eliminated, the gain adjusting circuit 280 changes back the frequency division ratio to 1/N0 from 1/N1 to thereby change the frequency of the clock signal from F1 to F0 (that is, change back the phase of the recording clock signal to the phase thereof, which is not corrected yet), so that the writing of the data is performed.

When the deviation caused between the phase of the ATIP synchronization signal and the phase of the recording data synchronization signal is corrected, the frequency division ratio of the (1/N)-frequency-divider 242 may be held at a constant value until the deviation caused between the phase of the ATIP synchronization signal and the phase of the recording data synchronization signal is eliminated, without stepwisely changing the frequency division ratio of the (1/N)-frequency-divider 242, as described above.

Third Modification

Although it has been described in the foregoing description of the first embodiment that the phase deviation caused between the ATIP synchronization signal and the recording data synchronization signal is stepwisely corrected, the phase deviation caused between the ATIP synchronization signal and the recording data synchronization signal can be corrected until the subsequent ATIP synchronization signal and the subsequent recording data synchronization signal are detected, as long as this modification has evil effects, such as degradation in the recording quality. Incidentally, when the correction of the positional deviation caused between the ATIP information and the recording data is completed by changing the frequency division ratio, which is set in the (1/N)-frequency-divider 242, until the subsequent ATIP synchronization signal and the subsequent recording data synchronization signal are detected, it is preferable to change back the frequency division ratio set in the (1/N)-frequency-divider 242 to an original value (that is, without waiting until the ATIP synchronization signal and the recording data synchronization signal are detected)

Fourth Modification

The aforementioned first embodiment is configured so that the phase difference detection circuit 270 detects the first phase difference detection signal and the second phase difference detection signal, that when detecting that one of the phase difference detection signals rises from a low level to a high level, the internal counter 271, the phase difference detection circuit 270 activates the internal counter 271 and outputs phase difference information corresponding to a result of the counting to the gain adjusting circuit 280. However, the apparatus may be adapted so that a permissible range of a phase difference (for example, the count value is equal to or less than "2") is preliminarily set, and that the aforementioned phase difference information is outputted to the gain adjusting circuit 280 only when the result (for example, the count value is "5") of the counting performed by the internal counter 271 exceeds the permissible range of the phase difference.

Fifth Modification

Although the optical disc recording apparatus employing a CAV (Constant Angular Velocity) system, in which the clock VCO 241 is locked to an ATIP clock signal to thereby control the writing of data on an optical disc 5 by changing the recording clock signal, has been described in the foregoing description of the first embodiment by way of example, the first embodiment and the modifications thereof can be applied to an optical disc recording apparatus employing, for instance, a CLV (Constant Linear and Velocity) system, and optical disc recording apparatuses respectively employing all recording systems.

B. Second Embodiment

Figure 15:
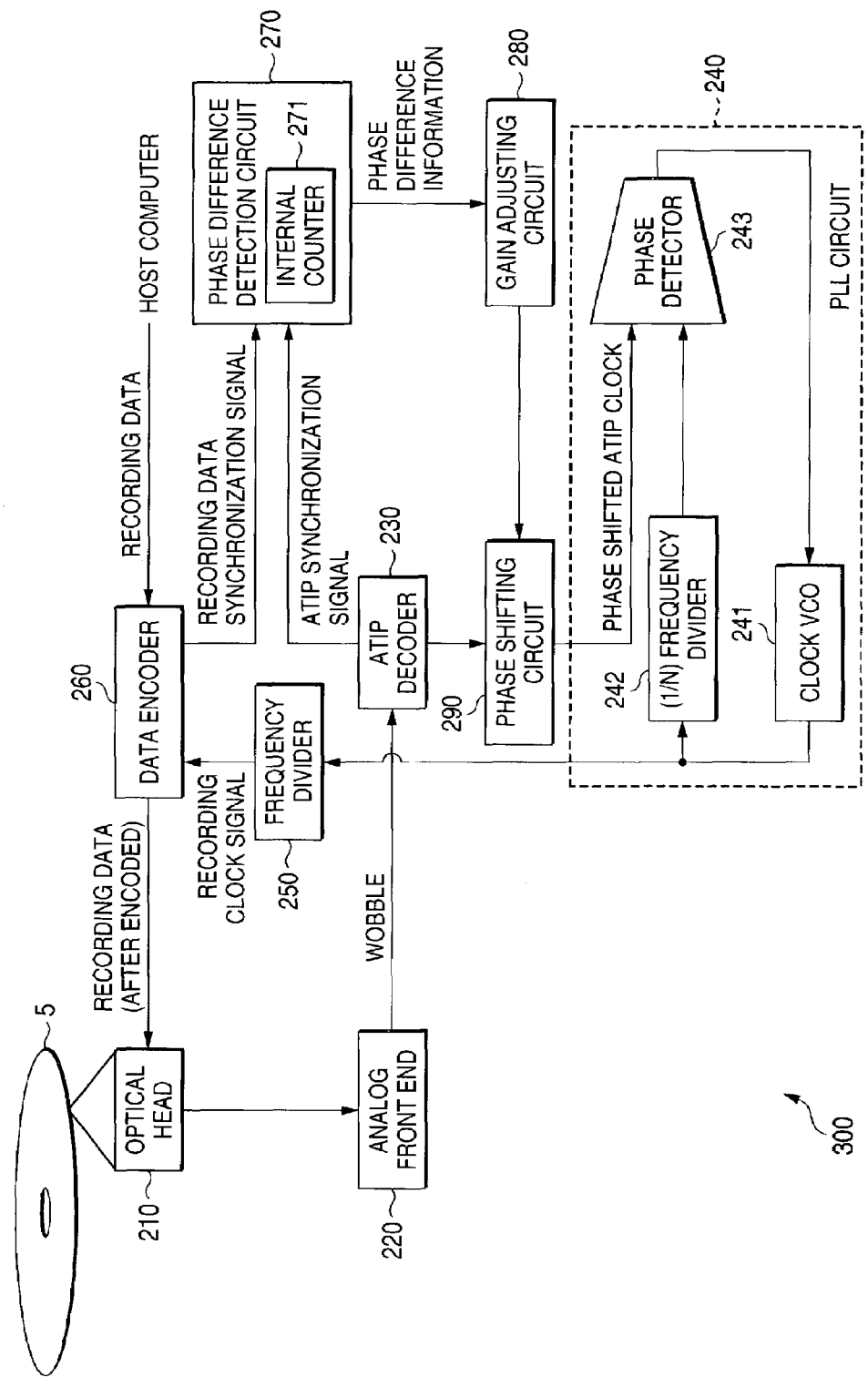
FIG. 15 is a block view illustrating the configuration of an optical disc recording apparatus according to a second embodiment.

FIG. 15 is a view illustrating the configuration of an optical disc recording apparatus according to the second embodiment.

The optical disc recording apparatus 200 according to the first embodiment is configured so that the positional deviation caused between the ATIP information and the recording data is corrected by suitably setting the frequency division ratio of the (1/N)-frequency-divider 242. However, an optical disc recording apparatus 300 according to the second embodiment is adapted so that the positional deviation caused between the ATIP information and the recording data is corrected by suitably changing the phase of an ATIP clock signal outputted from the ATIP decoder 230. Incidentally, the optical disc recording apparatus 300 according to this embodiment is nearly the same as the optical disc recording apparatus 200 shown in FIG. 1, expect that a phase shifting circuit 290 is interposed between the ATIP decoder 230 and a phase detection circuit 243. Therefore, each of constituent portions of the second embodiment is designated by the same reference character as used for denoting a corresponding component of the first embodiment. Thus, the description of such constituent portions is omitted herein.

When the gain adjusting circuit 280 receives phase difference information from the phase detection circuit 270, which indicates that the phase of the ATIP synchronization signal leads the phase of the recording data synchronization signal by, for instance, 10 counts (see FIG. 6), the gain adjusting circuit 280 determines a phase shift amount by referring to a phase deviation correction table, which is stored in a memory (not shown), so as to correct the phase deviation. Then, the gain adjusting circuit 280 outputs a signal representing the phase shift amount to a phase shifting circuit 290 as the phase shift amount. In this case, the phase of the ATIP synchronization signal leads the phase of the recording data synchronization signal. Thus, the gain adjusting circuit 280 outputs phase shift information, which indicates that the phase of the ATIP clock signal is advanced, to the phase shifting circuit 290. The phase shifting circuit 290 advances the phase of the ATIP clock signal according to the phase shift information, and then outputs a resultant signal to the PLL circuit 240.

As described above, the PLL circuit 240 employs an ATIP clock signal as a reference signal, and outputs a clock signal, whose frequency is a multiple of the reference frequency of the reference signal. Therefore, the phase shifting circuit 290 is caused to advance the phase of the ATIP clock signal to thereby make the frequency of the ATIP clock signal, which is inputted to the PLL circuit 240, that is, the reference frequency high, as compared with the reference frequency used before the phase of the ATIP clock signal is advanced. Moreover, the frequency of the recording clock signal supplied from the PLL circuit 240 to the data encoder 260 through the frequency divider 250 is made to be high. Consequently, the data encoder 260 reads the recording data synchronization signal with timing quicker than the timing used before the phase of the ATIP clock signal is advanced. This enables the correction of the positional deviation caused between the ATIP information and the recording data. Incidentally, an operation to be performed upon completion of this process, and an operation in the case, in which the phase of the recording data synchronization signal leads the phase of the ATIP synchronization, are similar to the operations having been described in the description of the first embodiment. Thus, the description of such operations is omitted herein.

C. Third Embodiment

Figure 16:
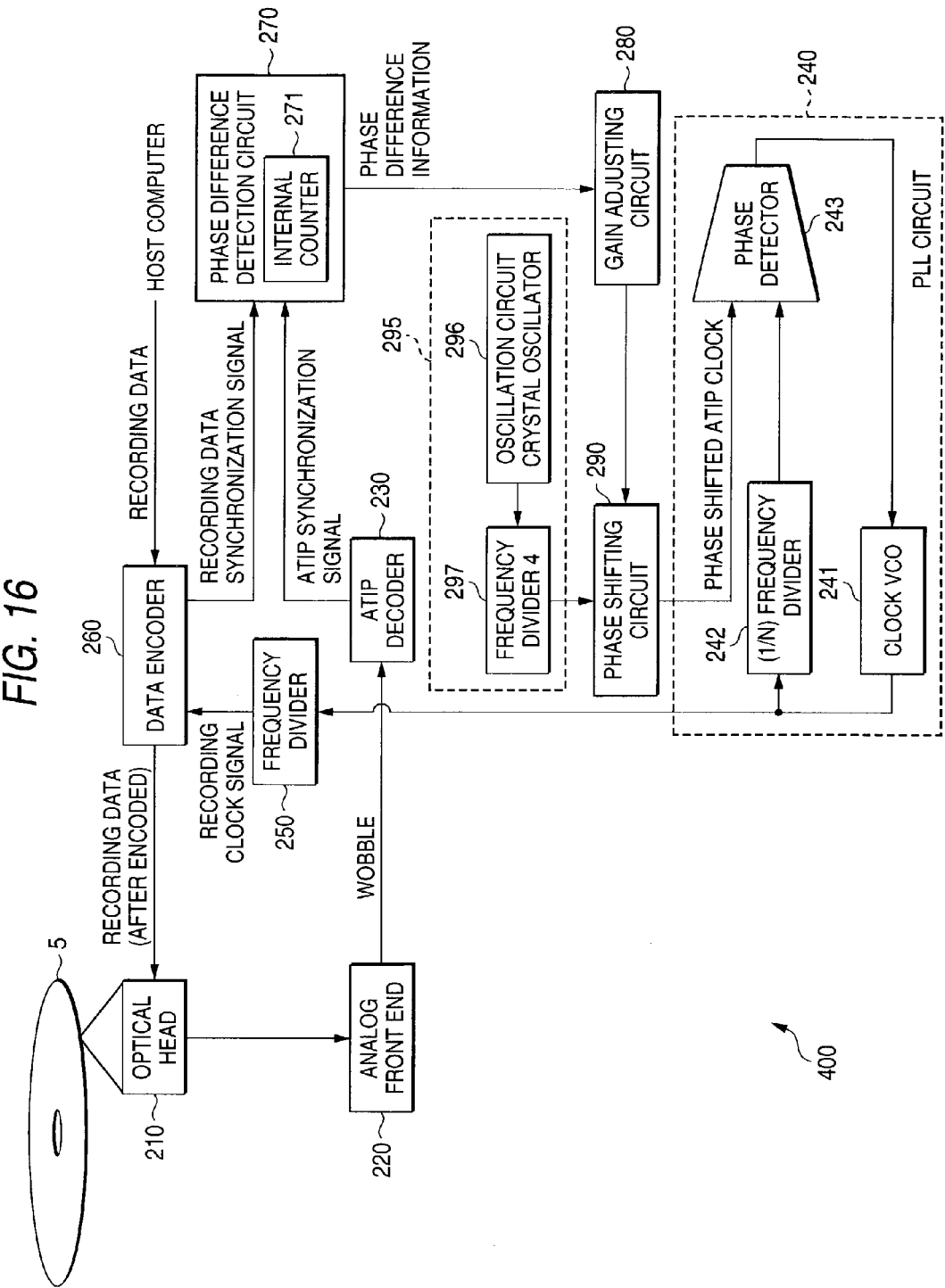
FIG. 16 is a block view illustrating the configuration of an optical disc recording apparatus according to a third embodiment.
Figure 17:
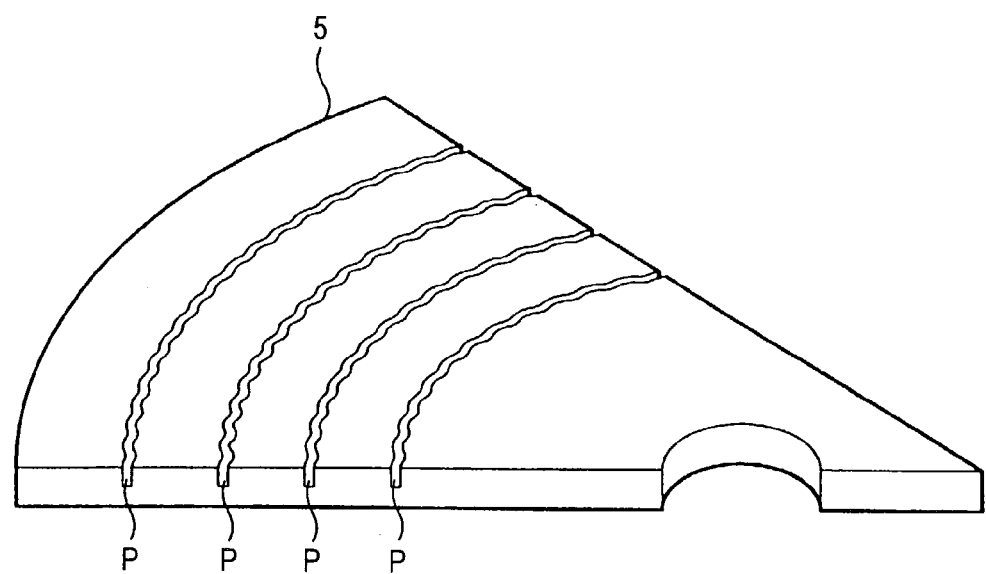
FIG. 17 is a view schematically illustrating an optical disc.

FIG. 16 is a block view illustrating the configuration of an optical disc recording apparatus 400 according to a third embodiment.

The aforementioned optical disc recording apparatus 300 according to the second embodiment is configured so that the positional deviation caused between the ATIP information and the recording data is corrected by suitably changing the phase of the ATIP clock outputted from the ATIP decoder 230. In contrast, the optical disc recording apparatus 400 according to the third embodiment corrects the positional deviation caused between the ATIP information and the recording data by suitably changing the phase of the clock signal outputted from an oscillation circuit 295.

The oscillation circuit 295 has a crystal oscillator 296 for oscillating a clock signal (hereunder referred to as a crystal clock signal) having a predetermined frequency under the control of a control portion (not shown), and a frequency divider 297 for frequency-dividing a crystal clock signal with a predetermined frequency division ratio, and for outputting a resultant signal to a phase shifting circuit 290.

The phase shifting circuit 290 shifts the phase of an inputted crystal clock signal according to phase shift information (see the description of the aforementioned second embodiment) outputted from the gain adjusting circuit 280, and then outputs a resultant signal to a PLL circuit 240. Incidentally, an operation to be thereafter performed is similar to that of the aforementioned second embodiment. Thus, the description of such an operation is omitted herein.

Incidentally, the invention can be applied to optical disc recording apparatuses adapted to write writing data to all optical discs, such as a CD-RW, a CD-R, a DVD-R (Digital Versatile Disc Recordable), a DVD0-RAM (Digital Versatile Disc Random Access Memory), and a PC-RW (Phase Change ReWritable).

Further, the aforementioned various functions relating to the optical disc recording apparatus can be implemented by software. Practically, the software is installed from a recording medium (for example, a CD-ROM), on which the software. is recorded, in the optical disc recording apparatus. Alternatively, the software is downloaded from a serer having the software through a network (for instance, the Internet), and then installed in the optical disc recording apparatus through a personal computer. Thus, the aforementioned various functions can be implemented by the software.

As described above, according to the invention, it is enabled to detect a positional deviation caused between ATIP information and recording data, and to correct such a positional deviation.

What is claimed is:

1. An optical disc recording apparatus comprising:
   a recording clock generating circuit for generating a recording clock signal for controlling timing with which recording data to be recorded on an optical disc is written thereto;
   an ATIP decoder for detecting an ATIP synchronization signal from ATIP information preliminarily recorded on the optical disc;
   a data encoder for generating a recording data synchronization signal, for adding the recording data synchronization signal to the recording data at predetermined intervals and transmitting the recording data synchronization signal;
   a phase difference detection circuit for detecting a difference between the ATIP synchronization signal and the transmitted recording data synchronization signal; and
   a gain adjusting circuit for controlling a phase of the recording clock signal, generated from the recording clock generating circuit, according to the phase difference detected by the phase difference detection circuit.

2. The optical disc recording apparatus according to claim 1, wherein when the phase difference is detected by the phase difference detection circuit, the gain adjusting circuit changes the phase of the recording clock signal so that a phase difference detected subsequently by the phase difference detection circuit is less than the phase difference detected previously.

3. The optical disc recording apparatus according to claim 2, wherein the gain adjusting circuit changes the phase of the recording clock signal so that the phase difference detected by the phase difference detection circuit stepwisely decreases.

4. The optical disc recording apparatus according to claim 1, wherein
   the ATIP decoder detects the ATIP synchronization signal from the ATIP information and generates an ATIP clock signal,
   the recording clock generating circuit includes a PLL circuit adapted to use the ATIP clock signal as a reference signal, and to output a clock signal, whose frequency is a multiple of a frequency of the reference signal, as the recording clock signal, and
   the gain adjusting circuit determines, according to the phase difference detected by the phase difference detection circuit, a multiple by which the frequency of the reference signal is multiplied.

5. The optical disc recording apparatus according to claim 1, wherein
   the ATIP decoder detects the ATIP synchronization signal from the ATIP information and generates an ATIP clock signal,
   the recording clock generating circuit comprises:
   a phase correction circuit for receiving the ATIP clock signal and performing phase correction on the received ATIP clock signal; and
   a PLL circuit adapted to use the ATIP clock signal, subjected to the phase correction by the phase cor rection circuit, as a reference signal, and to output a clock signal, whose frequency is a multiple of a frequency of the reference signal, as the recording clock signal, and the gain adjusting circuit determines a correction amount used in the phase correction according to the phase difference detected by the phase difference detection circuit.

6. The optical disc recording apparatus according to claim 1 further comprising an oscillator for generating a clock signal having a predetermined frequency, wherein the recording clock generating circuit comprises:

a phase correction circuit for receiving the clock signal and performing phase correction on the received clock signal; and a PLL circuit adapted to use the clock signal, subjected to the phase correction by the phase correction circuit, as a reference signal, and to output a clock signal, whose frequency is a multiple of a frequency of the reference signal, as the recording clock signal, and wherein the gain adjusting circuit determines a correction amount used in the phase correction according to the phase difference detected by the phase difference detection circuit.

7. A method of controlling an optical disc recording apparatus which controls timing with which recording data to be recorded on an optical disc in response to a recording clock signal, the method comprising:

detecting an ATIP synchronization signal from ATIP information preliminarily recorded on the optical disc;

adding a recording data synchronization signal to the recording data at predetermined intervals;

transmitting the recording data synchronization signal added to the recording data at predetermined intervals;

detecting a phase difference between the ATIP synchronization signal and the recording data synchronization signal; and controlling a phase of the recording clock signal according to the detected phase difference.

* * * * *